(12) United States Patent
Matsumoto et al.

(10) Patent No.: US 10,715,916 B2
(45) Date of Patent: Jul. 14, 2020

(54) SEATBACK

(71) Applicant: TOYOTA JIDOSHA KABUSHIKI KAISHA, Toyota-shi, Aichi-ken (JP)

(72) Inventors: Kozo Matsumoto, Nisshin (JP); Takuya Mutou, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/434,201

(22) Filed: Jun. 7, 2019

(65) Prior Publication Data

US 2019/0394571 A1 Dec. 26, 2019

(30) Foreign Application Priority Data

Jun. 25, 2018 (JP) .................. 2018-119995

(51) Int. Cl.
*H04R 5/02* (2006.01)
*B60R 11/02* (2006.01)
*H04R 1/02* (2006.01)

(52) U.S. Cl.
CPC .......... *H04R 5/023* (2013.01); *B60R 11/0217* (2013.01); *H04R 1/023* (2013.01); *H04R 2499/13* (2013.01)

(58) Field of Classification Search
CPC ...... H04R 2499/13; H04R 1/02; H04R 1/086; B60R 11/0217; B60R 2011/0017

USPC .................. 381/391, 389, 86, 301
See application file for complete search history.

(56) References Cited

U.S. PATENT DOCUMENTS

| 2009/0212593 | A1* | 8/2009 | Larson | B60P 3/32 296/158 |
| 2015/0201260 | A1* | 7/2015 | Oswald | H04R 1/025 381/86 |
| 2016/0137106 | A1* | 5/2016 | Subat | B60R 11/0217 381/389 |
| 2019/0222924 | A1* | 7/2019 | Groleau | H04R 1/023 |

FOREIGN PATENT DOCUMENTS

| JP | 2005-323798 A | 11/2005 |
| JP | 2006-026045 A | 2/2006 |

* cited by examiner

*Primary Examiner* — Alexander Krzystan
(74) *Attorney, Agent, or Firm* — Oliff PLC (57) ABSTRACT

A speaker grill has a size and a shape that can be determined regardless of a size of a speaker body disposed inside a vehicle seatback. In the seatback, a speaker is secured to a speaker bracket. A flexible urethane segment and a cover, each of which includes an opening, are disposed on the front side of the seatback. A rigid urethane segment is disposed on a wall of the opening to surround the opening. A speaker grille over a front surface of the speaker is firmly inserted in the rigid urethane segment.

3 Claims, 9 Drawing Sheets

SEATBACK

CROSS REFERENCE TO RELATED APPLICATION

This application claims priority to Japanese Patent Application No. 2018-119995 filed on Jun. 25, 2018, which is incorporated herein by reference in its entirety including the specification, claims, drawings, and abstract.

TECHNICAL FIELD

The present disclosure relates to a seatback for a vehicle seat, in particular, to a seatback in which a speaker is internally disposed.

BACKGROUND

Vehicle seats including speakers embedded in seatbacks (backrests) have been known.

JP 2005-323798A discloses a seatback in which a housing of a speaker is embedded in a space formed in a pad of the seatback. The housing is attached to a frame of the seatback. A speaker grille for protecting the speaker is attached from the front side of the seatback. The speaker grille includes claws that are inserted into claw holes formed in the housing around the speaker body to secure the speaker grille.

JP 2006-026045A discloses a structure in which a speaker is embedded in an opening of a pad of a seatback, and a cushion that transmits audio is provided in front of the speaker.

SUMMARY

In JP 2005-323798A, the speaker grille is formed to be larger for its entire perimeter than the speaker body because the speaker grille is attached around the outer perimeter of the speaker body.

An object of the present disclosure is to provide a seatback with a speaker grille whose size and shape can be determined regardless of the size of the speaker body.

A seatback according to the present disclosure includes one or more structural members disposed inside the seatback of a vehicle seat, and a speaker secured to the one or more structural members. The speaker includes a diaphragm. The seatback further includes a speaker grille in front of the diaphragm for protecting the diaphragm, and a pad member that covers a front surface of the seatback. The pad member includes an opening in front of the diaphragm of the speaker. An elastic member that is more rigid than the pad member is disposed on a wall of the opening to surround the opening. The speaker grille is firmly inserted in the elastic member to cover the opening.

The seatback of a vehicle seat means a backrest portion disposed to face a passenger's back. The one or more structural members are disposed inside the seatback to ensure the rigidity of the seatback. The structural members may have, for example, a frame structure in which metal pipes or the like are assembled like a ladder, or a hollow shell structure made of a resin or the like. In case when the seatback is secured to the vehicle as for the seatback in a vehicle rear seat, the one or more structural members inside the seatback may be unitedly provided with structural members of a vehicle body.

The speaker grille is disposed in front of the diaphragm for protecting the diaphragm. The speaker grille may also protect other parts and portions in addition to the speaker. The speaker grille includes small holes at least in front of the diaphragm to achieve favorable sound wave propagation properties. The pad member covers a surface of the seatback. The pad member is made of, for example, a combination of a thick resin foam having cushioning properties, and a cover. The rigidity of the pad member is determined in consideration of passengers' comfort when seated and shape preserving properties, or cushion properties for protecting passengers in case of a crash of the vehicle.

The pad member includes an opening in front of the diaphragm of the speaker. In this way, the diaphragm is partially or entirely covered with no pad member. The opening may be expanded to protrude from the perimeter of the diaphragm. A wall of the opening defines the opening along the depth of the opening (from the front surface of the seatback towards the inner side of the seat). In other words, the wall of the pad member that faces the opening is the wall of the opening. An elastic member that is more rigid than the pad member is disposed on the wall. The elastic member has rigidity so that the speaker grille can be firmly inserted to be secured. The elastic member is more rigid at least than the rigidity required for the pad member. For example, the elastic member may be made of a resin of the same composition as a portion or entire pad member but formed more rigid with different communication properties of internal open cells. Alternatively, the elastic member may be made rigid using a resin of a composition different from that of the pad member.

The elastic member is disposed to surround the opening of the pad member in at least one loop. The elastic member may be of a continuous single piece, or multiple pieces separated at one or more points along the loop. The elastic member may be disposed on the inner circumference side of the pad member to be directly visible on the wall of the opening. Alternatively, the elastic member may be disposed not to be visible on the wall of the opening with a front surface of the wall being covered with the cover of the pad member or the like. The elastic member may be disposed entirely or partially along the thickness of the wall. In one embodiment, for an example of a partial disposal on the wall, the elastic member is not disposed on the wall on the outer surface side of the seatback (for example, for the thickness of 5 mm, 10 mm, 15 mm, 20 mm, or 25 mm from the outer surface) but disposed further on the back side to maintain passenger's contact comfortability when leaning against the seatback. The speaker grille is firmly inserted in the elastic member.

In one embodiment of the seatback according to the present disclosure, the inner wall of the elastic member has a shape tilted to circumferentially inside from an opening side to a back side of the opening such that the area of the opening becomes smaller on the back side of the opening than on the opening side.

The inner wall of the elastic member may have a tilted shape partially along the circumference. Of course, the tilted shape may be provided entirely along the circumference. While the tilted shape may be linearly tilted, the tilted shape may have a curved shape so that the tilting becomes gradual (the opening area ratio becomes smaller) or steeper (the opening area ratio becomes larger) towards the back. Alternatively, the tilting shape may be stepwise including multiple steps.

In one embodiment of the seatback according to the present disclosure, each of the wall of the opening and an inner wall of the elastic member is partially formed to have a perimeter expanded portion that circumferentially outwardly protrudes from the perimeter of the speaker grille.

With the speaker grille being firmly inserted in the elastic member, a space is formed by the perimeter expanded portion between the speaker grille and the opening and between the speaker grille and the elastic member.

One or more spaces (two, three, or four or more) may be provided. The space may be formed such that while the speaker grille is substantially linear along the perimeter, walls of the opening and the elastic member are expanded. In contrast, the walls of the opening and the elastic member may be substantially linear along the perimeter, while the perimeter of the speaker grille has a shape with an inwardly narrowed portion (the walls of the opening and the elastic member can be considered to be relatively widened). Further, it is also possible that the walls of the opening and the elastic member are widened, while the perimeter of the speaker grille is narrowed. The formed space may have a round shape such as a circle or ellipse, or a polygonal shape such as a triangle, rectangle, pentagon, or hexagon.

The space may have a minor axis (a shortest segment passing through the center of gravity of the space between two points on the space perimeter; short sides in case of a rectangular) of, for example, 5 mm or more, 10 mm or more, or 15 mm or more to allow insertion of a tool. Alternatively, the space may have a minor axis of 20 mm or more, 25 mm or more, 30 mm or more, or 35 mm or more to allow insertion of one or more fingers of an operator. Further, the space may have a major axis (a longest segment passing through the center of gravity of the space between two points on the space perimeter; diagonal lines in case of a rectangular) of, for example, 60 mm or less, 50 mm or less, 40 mm or less, 30 mm or less, or 20 mm or less to make foreign objects less likely to enter the space.

In one embodiment of the seatback according to the present disclosure, each of the speaker grille and the one or more structural members includes a joint portion such that the joint portions are secured together when the speaker grille is firmly inserted in the elastic member.

For example, the joint portion is disposed on the back surface of the speaker grille (the surface facing the speaker) and another joint portion is disposed at a corresponding position on the front surface of the structural member. The joint portions may be a claw and a claw hole, or a push rivet and a hole. One or more (two, three, or four or more) pairs of the joint portions may be provided.

According to the present disclosure, a speaker grille can be mounted by determining the size and the shape of the speaker grille regardless of the size of the speaker body.

BRIEF DESCRIPTION OF DRAWINGS

Embodiment(s) of the present disclosure will be described by reference to the following figures, wherein.

DESCRIPTION OF EMBODIMENTS

Embodiments according to the present disclosure are described below with reference to the attached drawings. Although specific aspects are described below for easy understanding, these specifics are provided to exemplary show embodiments. Various other embodiments are also available.

Figure 1:
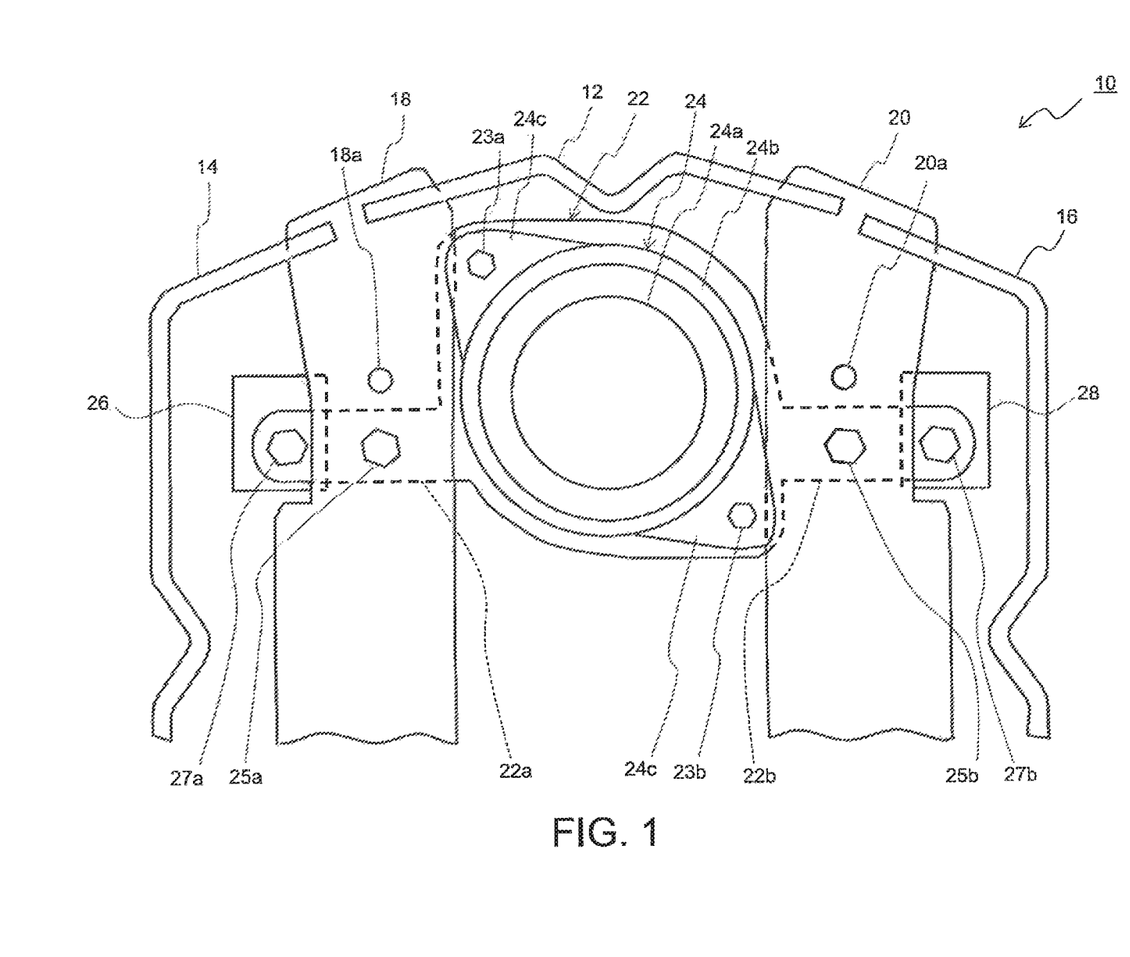
FIG. 1 is a front view showing an internal structure of a seatback and a speaker according to an embodiment of the present disclosure.

FIG. 1 is a front view, showing a schematic structure of an upper portion of a seatback 10 according to an embodiment of the present disclosure. The seatback 10 is disposed at a rear seat of a vehicle. FIG. 1 shows the seatback 10 in the middle of a manufacturing process to assemble the seatback 10.

In the seatback 10, pipe members 12, 14, 16 that are structural members made of metal, such as an aluminum alloy, are used to form a frame that is an internal structure. The pipe member 12 is a symmetrical member that is disposed around the back of passenger's head or neck. The pipe member 14 is disposed from around the passenger's right ear or shoulder to a right side of the passenger's body. The pipe member 16 is shaped symmetrical to the pipe member 14 and disposed on the left side of the passenger.

The pipe members 12, 14 are attached by welding or other means to a seat bracket 18 that is a plate shaped member made of metal, such as an aluminum alloy. The seat bracket 18 is disposed around the right side of the passenger's neck or back. The seat bracket 18 includes a through hole 18a through which a push rivet is inserted and a bolt hole for attaching a speaker bracket 22. The pipe members 12, 16 are secured to a seat bracket 20. The seat bracket 20 is shaped symmetrical to the seat bracket 18. The seat bracket 20 includes a through hole 20a and a bolt hole. Similarly as the pipe members 12, 14, 16, the seat brackets 18, 20 are structural members forming the frame that is an internal structure of the seatback 10.

The speaker bracket 22 is attached to the seat brackets 18, 20. The speaker bracket 22 is a plate-shaped member for securing a speaker. The speaker bracket 22 is made of a metal, such as an aluminum alloy. The speaker bracket 22 includes a circular through hole around the center. A speaker 24 is inserted through the through hole. The speaker 24 is secured with stud bolts 23a, 23b inserted through two securing holes disposed around the through hole. The speaker bracket 22 includes extensions 22a, 22b that respectively extend on the right and the left. Two bolt holes are provided for each of the extensions. FIG. 1 shows bolts 25a, 25b, 27a, 27b that pass through the bolt holes 22a, 22b. The bolts 25a, 25b secure the extensions 22a, 22b to the seat brackets 18, 20. The bolts 27a, 27b secure the extensions 22a, 22b to brackets 26, 28 that are respectively secured to the vehicle body. In this way, the speaker bracket 22 secures the seatback 10 to the vehicle body, and the speaker 24 is secured inside the seatback 10. In other words, the speaker bracket 22 is a structural member that serves to secure the seatback 10 to the vehicle body and also the speaker 24 inside the seatback 10.

The speaker 24 is secured so that a disk-shaped diaphragm 24a faces the front (facing the passenger back). A ring-shaped frame 24b surrounds the circumference of the diaphragm 24a. The frame 24b includes securing portions 24c in each of which a bolt hole is formed. As described above, the speaker 24 is secured to the speaker bracket 22 with the stud bolts 23a, 23b. The speaker 24 is a dynamic speaker. A permanent magnet and a coil are disposed behind the diaphragm 24a. Sound is produced by vibration of the diaphragm 24a that is caused by interaction between the magnetic field generated when an input voltage is applied to the coil and the magnetic field of the permanent magnet.

Figure 2:
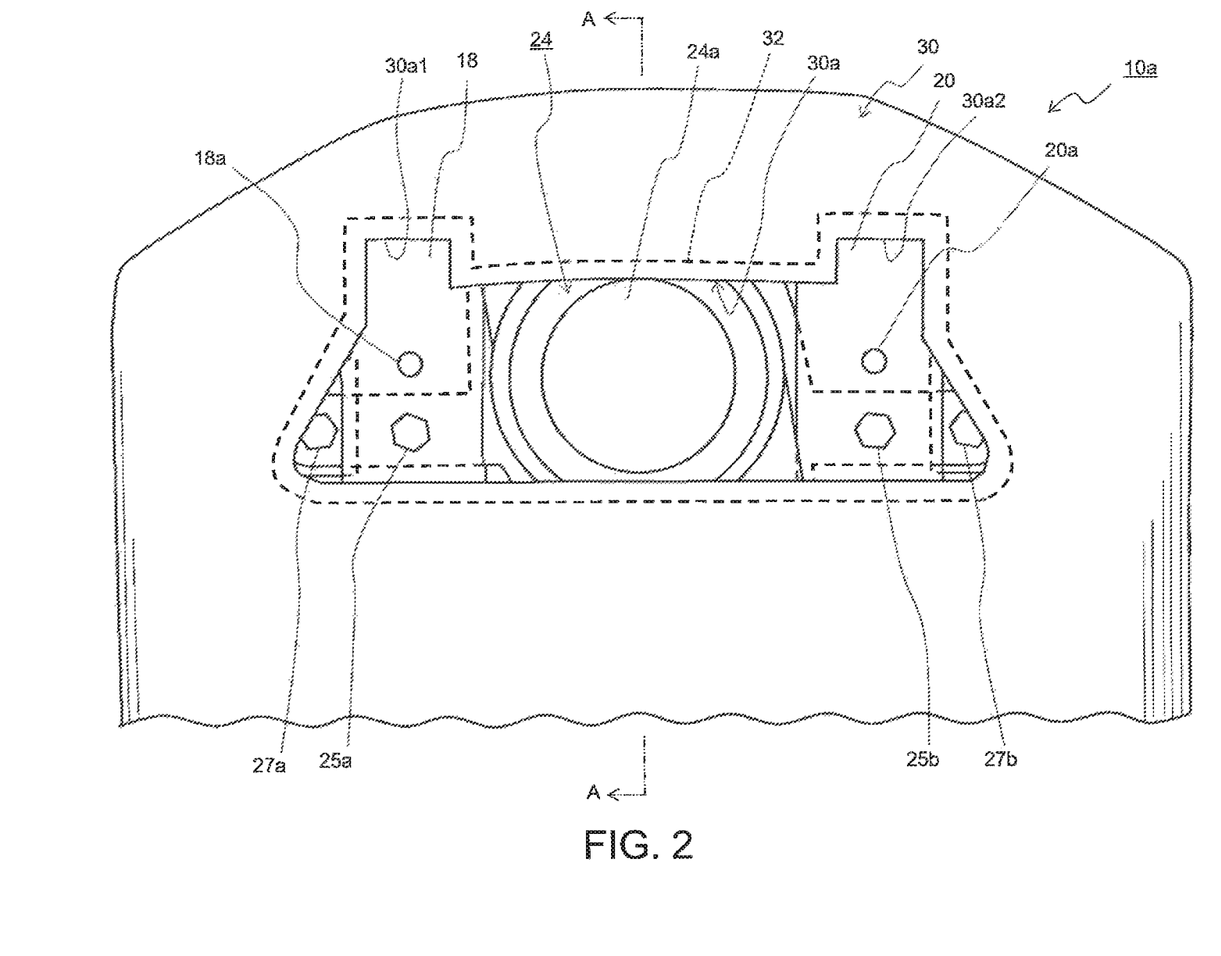
FIG. 2 is a front view of a seatback covered with a cover that includes an opening.

FIG. 2 is a front view showing a seatback 10a on which a cover 30 is attached. In the seatback 10a, the seatback 10 in FIG. 1 is covered by a relatively flexible urethane segment on which the cover 30 is disposed. The flexible urethane segment is separately formed to fit the seatback 10 so that the urethane segment covers the front, top, and sides of the seatback 10. The rigidity of the flexible urethane segment is determined so that passengers can comfortably lean against the seatback 10. For example, so-called flexible urethane is used for the flexible urethane segment.

The cover 30 is formed to fit the seatback 10a by cutting out a predetermined shape from a flat-shaped synthetic leather and sewing it. The cover 30 is disposed to cover, from the top, the portions of the seatback 10 that are covered by the flexible urethane segment, and pulled outward to be attached with a sufficient tension maintained. The flexible urethane segment and the cover 30 are examples of the pad members that enhance the passenger's comfort when seated.

The cover 30 includes a horizontally-longer opening 30a on an upper front side of the seatback 10a. Because an opening having a shape identical to that of the opening 30a is provided in the flexible urethane segment, the internal structure of the seatback 10 shown in FIG. 1 is visible through the opening 30a. Specifically, the diaphragm 24a of the speaker 24 is almost entirely visible around the center of the opening 30a. In the present embodiment, the vertical length of the opening 30a is set to be about the shortest length sufficient for good sound from the speaker 24. The top and bottom portions of the frame 24b around the diaphragm 24a are not visible. This arrangement seeks achievement of, a high cushion quality of the seatback 10; in other words, comfortability while being seated, and high sound quality of the speaker.

On the left of the speaker 24 when viewed from the front, the seat bracket 18 is partially visible such that the through hole 18a in the seat bracket 18 and the bolt 25a fastened to the bolt hole below the through hole 18a are visible. Further, on the left of them, the bolt 27a is also almost entirely visible. The bolt 27a secures, via the speaker bracket 22, the structural members of the seatback 10 to the bracket 26 of the vehicle body. Thus, the seatback 10a including the cover 30 can be removed from the vehicle body by removing the bolt 27a and the bolt 27b on the right through the opening 30a. Similarly, on the right of the speaker 24, the seat bracket 20, the through hole 20a, and the bolt 25b, 27b are visible. The horizontal length of the opening 30a is determined to be about the shortest length to enable removal of the bolts 27a, 27b in order to achieve both the size of the opening required to remove the seatback 10 and a sufficient cushion quality of the seat.

A rigid urethane segment 32 that is more rigid than the above-described flexible urethane segment is disposed along the perimeter of the opening 30a. The rigid urethane segment 32 is an example of a rigid elastic member. The rigid urethane segment 32 has sufficient flexibility to be slightly deformable when a force is applied by an operator. Although it may be impossible to specifically describe the rigidity of the rigid urethane segment 32, the rigid urethane segment 32 may have an average rigidity of, for example, 1.5, 2, 3, 5, 10, 15, 20, 30, 50, or 100 times or more the average rigidity of the flexible urethane segment in a Rockwell hardness measurement using a steel ball as an indenter. Alternatively, the rigid urethane segment 32 may have an average density of 1.5, 2, 3, 5, 10, 15, 20, 30, 50, or 100 times or more the average density of the flexible urethane segment. The rigidity of the rigid urethane segment 32 is determined to have such a rigidity that the speaker grille can be firmly inserted to be secured.

The opening 30a is formed to have a substantially horizontally-long trapezoid shape. More in detail, perimeter expanded portions that form circumferentially-outward protrusions are disposed on the right and left of an upper portion of the trapezoid shape. In this way, expanded spaces 30a1, 30a2 are formed respectively at portions facing the seat brackets 18, 20.

Figure 3:
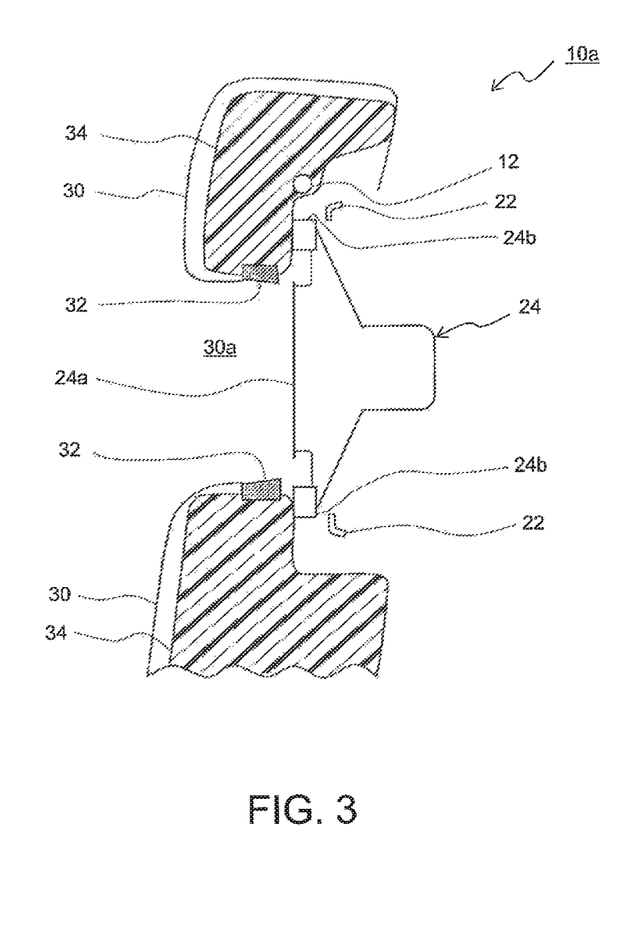
FIG. 3 is a cross sectional view taken along line A-A in FIG. 2, showing the seatback covered with the cover that includes the opening.

FIG. 3 is a cross sectional view taken along line A-A in FIG. 2. Line A-A passes through the horizontal center of the opening 30a. As shown in FIG. 3, a flexible urethane segment 34 is disposed on the inner side of the cover 30. A wall of the opening 30a is substantially formed by the flexible urethane segment 34. Specifically, at the opening 30a, the flexible urethane segment 34 is shaped to maintain a constant distance between the opposing walls from the outer side to the inner side of the seat (rearward along the depth of the seat). In other words, the flexible urethane segment 34 is formed so that the area of the opening is equal between the opening side and the back side (nearer to the diaphragm 24a of the speaker 24) of the opening 30a. The cover 30 is disposed to cover the flexible urethane segment 34.

The rigid urethane segment 32 is disposed to be engaged in the flexible urethane segment 34 at a relatively back side of the opening 30a. For the rigid urethane segment 32, a urethane segment having a ring shape that fits the opening 30a may be used. Alternatively, two or more rigid urethane segments 32 that are formed to fit the opening 30a when combined may be assembled when attaching them to the flexible urethane segment 34. The rigid urethane segment 32 may be unitedly formed with the flexible urethane segment 34 by disposing the rigid urethane segment 32 in advance in a die when forming the flexible urethane segment 34 by foaming. Alternatively, by preparing a recess in which the rigid urethane segment 32 is to be inserted while forming the flexible urethane segment 34, the rigid urethane segment 32 can be firmly inserted in the flexible urethane segment 34 after the forming. Adhesive may be applied between the rigid urethane segment 32 and the flexible urethane segment 34. Although it may further be possible to dispose a frame-shaped member made of a more rigid resin or other material between the rigid urethane segment 32 and the flexible urethane segment 34 to limit deformation of the rigid urethane segment 32, such a frame-shaped member may be omitted.

The rigid urethane segment 32 is disposed further inside in the opening 30a than the flexible urethane segment 34. Thus, when viewed from inside the opening 30a, the rigid urethane segment 32 is located in front of the flexible urethane segment 34 at least in the area described below where the speaker grille is firmly inserted to be secured. In other words, the rigid urethane segment 32 is positioned so that, when the speaker grille is inserted, the speaker grille is in direct contact with the rigid urethane segment 32. In the embodiment shown in FIG. 3, the cover 30 is disposed not to cover the inner circumference side of the rigid urethane segment 32. In order to achieve this, the cover 30 may be formed to have a length not reaching the rigid urethane segment 32. Alternatively, the cover 30 may pass between the flexible urethane segment 34 and the rigid urethane segment 32.

In another embodiment as a variation, the cover 30 may be disposed on the inner circumference side of the opening 30a in relation to the rigid urethane segment 32. In this case, the opening 30a to which the rigid urethane segment 32 is attached is covered with the cover 30 having a sufficient length. The cover 30 is pulled to the back side of the opening 30a and attached. In this way, the opening 30a is entirely covered with the cover 30. With the speaker grille being inserted, the cover 30 is sandwiched between the rigid urethane segment 32 and the speaker grille.

The surface of the rigid urethane segment 32 that faces the opening 30a is tilted to circumferentially more inside in the opening 30a on the seat inner side than on the seat outer side. In other words, the opening formed by the rigid urethane segment 32 is tilted so that the area of the opening becomes smaller toward the back of the seat. In this way, the speaker grille can be easily secured.

Figure 4:
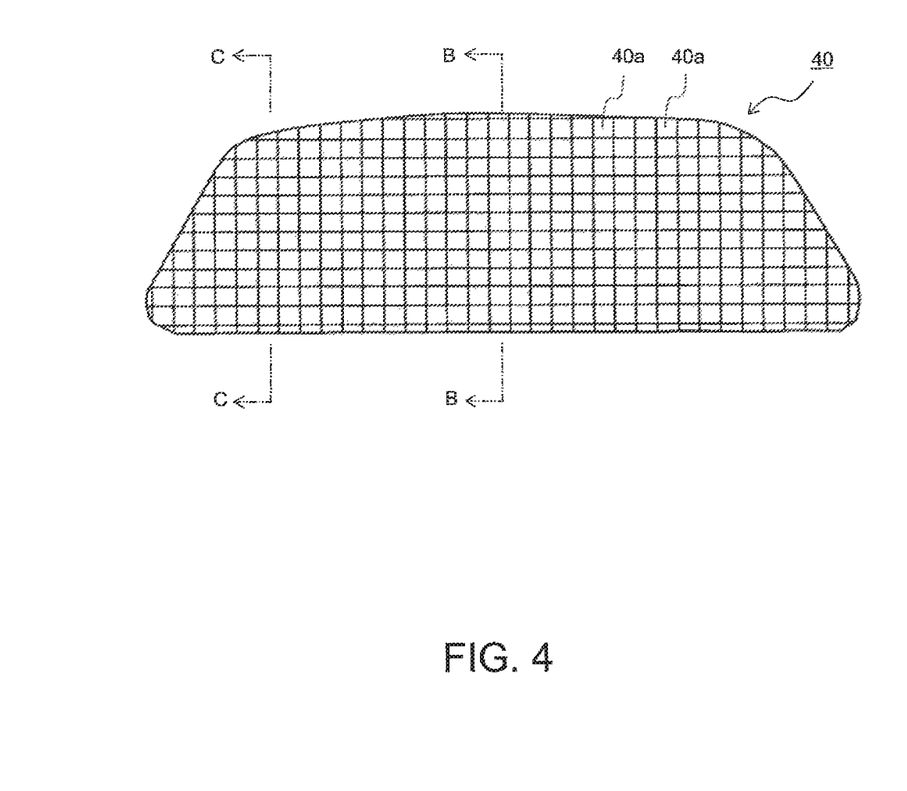
FIG. 4 is a front view of a speaker grille.
Figure 5:
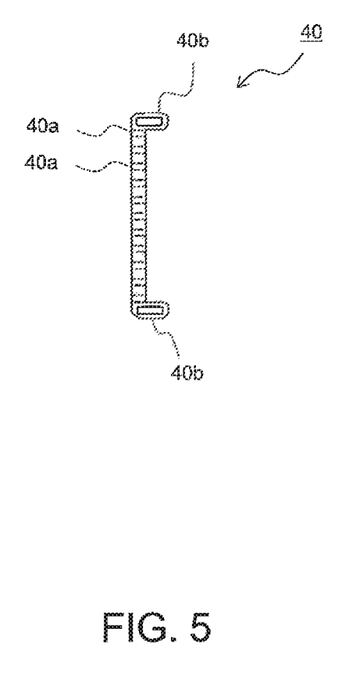
FIG. 5 is a cross sectional view of the speaker grille taken along line B-B in FIG. 4.
Figure 6:
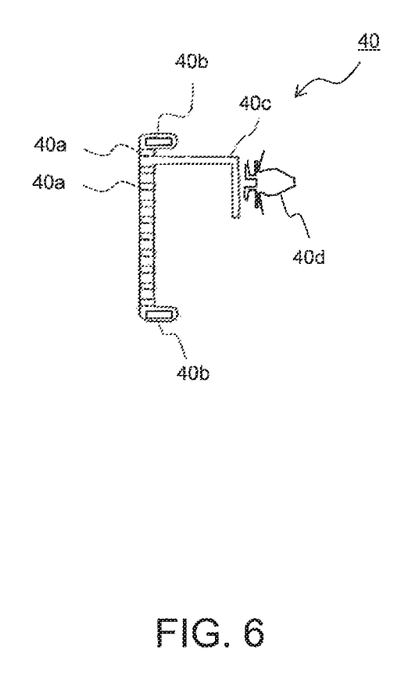
FIG. 6 is a cross sectional view of the speaker grille taken along line C-C in FIG. 4.

A speaker grille 40 is described below with reference to FIGS. 4 to 6. FIG. 4 is a front view of the speaker grille 40. FIG. 5 is a cross sectional view taken along line B-B in FIG. 4. FIG. 6 is a cross sectional view taken along line C-C in FIG. 4. Line B-B passes through the horizontal center of the speaker grille 40. With the speaker grille 40 being inserted in the opening 30a, line B-B overlaps line A-A in FIG. 2, while Line C-C runs over the expanded space 30a1 and the through hole 18a in FIG. 2.

The speaker grille 40 is disposed in front of the speaker 24 to protect the diaphragm 24a. The speaker grille 40 is made of a resin to have a sufficient strength. Because the speaker grille 40 is firmly inserted in the opening 30a shown in FIG. 2, the speaker grille 40 has a shape almost identical to but slightly larger than the opening 30a. However, the speaker grille 40 does not include a perimeter expanded portion corresponding to the expanded spaces 30a1, 30a2 of the opening 30a. The speaker grille 40 includes many small through holes 40a in a grid pattern on the front side so that sound waves from the diaphragm 24a can be smoothly transmitted forward.

As shown in FIG. 5, the speaker grille 40 includes, along the perimeter, a frame 40b that extends backward (insertion direction). The outer side surface of the frame 40b is substantially perpendicular to the surface that includes the many through holes 40a. Accordingly, with the frame 40b being inserted into the opening 30a, the frame 40b is substantially in parallel to the wall of the opening 30a.

As shown in FIG. 6, a protrusion 40c that is to be secured into the through hole 18a and a push rivet 40d are disposed on the back surface of the speaker grille 40. When a force is applied to the push rivet 40d from the back (from the left in FIG. 6), a tip portion of the push rivet 40d compresses and is inserted through the through hole 18a. After the insertion, the tip portion expands so that the speaker grille 40 is secured through the through hole 18a. In other words, the push rivet 40d and the through hole 18a form joint portions that are fastened in the insertion process of the speaker grille 40 into the opening 30a. An operator can easily remove the push rivet 40d through the through hole 18a by pushing a detach button at the center on the back surface of the push rivet 40d from the left to the right in FIG. 6.

Figure 7:
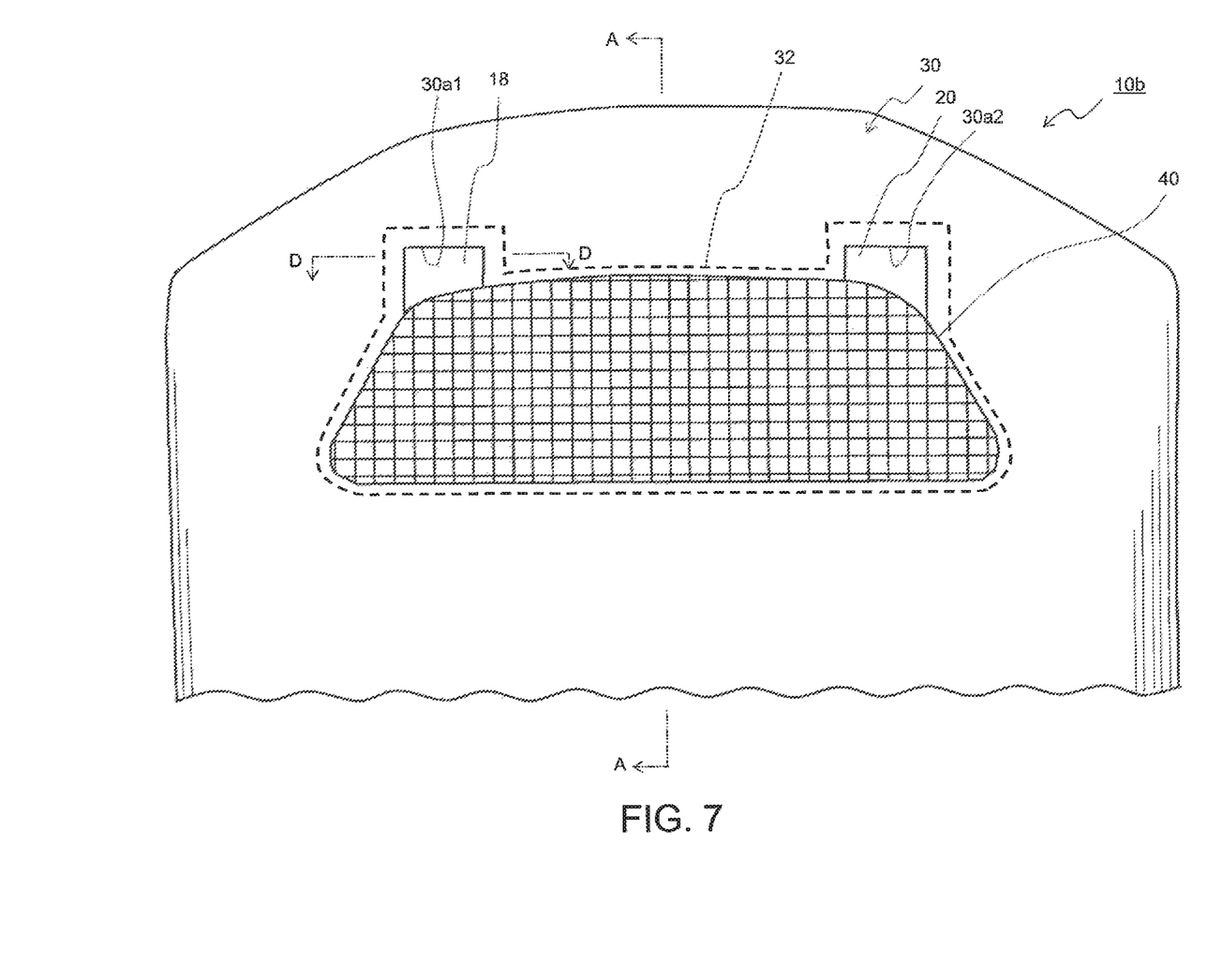
FIG. 7 is a front view of a seatback with a speaker grille attached.
Figure 8:
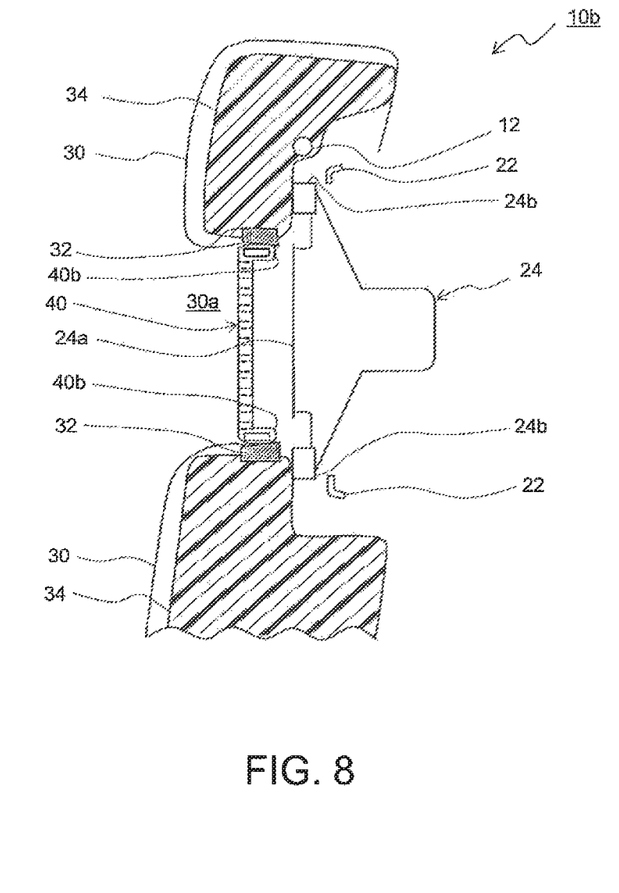
FIG. 8 is a cross sectional view of the seatback with the speaker grille attached, taken along line A-A in FIG. 7.

Processes to insert the speaker grille 40 into the opening 30a are described below with reference to FIGS. 7 and 8. FIG. 7 shows the speaker grille 40 shown in FIG. 4 that is inserted into the opening 30a shown in FIG. 2. FIG. 8 is a cross sectional view taken along line A-A in FIG. 7.

By an operator or an assembly robot, the speaker grille 40 is placed over the opening side of the opening 30a and pressed towards the inner side of the seat (backward into the opening 30a). Because the opening 30a is formed with the flexible urethane segment 34, the cover 30, and the rigid urethane segment 32, the opening 30a is relatively flexible. In this way, the opening 30a may be slightly displaceable right and left, front and back, and up and down. The shape of the opening 30a may also be slightly deformable. By inserting the much more rigid speaker grille 40, the opening 30a can sufficiently fit around the perimeter of the speaker grille 40.

As described above, the rigid urethane segment 32 is formed to be tilted such that the area of the opening is larger on the outer side of the seat than on the inner side of the seat. In this way, when the speaker grille 40 is around a front edge of the rigid urethane segment 32, a narrow space exists between the frame 40b that forms the perimeter of the speaker grille 40 and the rigid urethane segment 32 to allow a further smooth backward insertion of the speaker grille 40. When the speaker grille 40 is further inserted backward, the opening size of the rigid urethane segment 32 and the size of the frame 40b of the speaker grille 40 become almost equal to each other. However, because the rigid urethane segment 32 is elastic and can be compressively deformed when a force is applied, the speaker grille 40 can be further pressed backward and firmly inserted. The insertion process finishes when the speaker grille 40 compressively deforms the rigid urethane segment 32 with a certain force and reaction balancing the certain force is received from the rigid urethane segment 32. At this time, because a strong friction proportional to the reaction also acts between the speaker grille 40 and the rigid urethane segment 32, the speaker grille 40 and the rigid urethane segment 32 are attached tightly together and secured with a sufficient strength.

At the same time as the speaker grille 40 is firmly inserted in the rigid urethane segment 32, the push rivet 40d shown in FIG. 6 is pressed and inserted into the through hole 18a of the seat bracket 18, on the back side of the speaker grille 40. Such a rivet joint can make the speaker grille 40 not easily detachable from the opening 30a and enhance the joint strength.

As described above, the speaker grille 40 is secured by being firmly inserted in the rigid urethane segment 32. Thus, the speaker grille 40 can be installed by determining the size regardless of the size of the speaker 24. As the speaker grille 40 can be designed in accordance with the size of the opening 30a, the speaker grille 40 can be more freely designed.

As the rigid urethane segment 32 is designed to be more largely opened on the opening side than the back side, the speaker grille 40 is guided by the rigid urethane segment 32 during the insertion of the speaker grille 40, simplifying the installation process. Stable firm insertion of the speaker grille 40 in the rigid urethane segment 32 can also be expected.

By the joint using the push rivet 40d, the speaker grille 40 can be positioned with respect to a seatback 10b and secured in place. In this way, the speaker grille 40 can be prevented from being displaced when a seated passenger leans against the seatback 10b to cause deformation of the cover 30 or the flexible urethane segment 34, or apply a force to the speaker grille 40 itself.

In the seatback 10b shown in FIGS. 7 and 8, a seated passenger who leans against the seatback 10b can enjoy sound from a vehicle audio or the like by receiving sound from the speaker 24 around the back of his or her neck. Alternatively, by using the speaker 24 for an anti-noise controller, a noise reduced environment can be provided to the passenger. The speaker 24 may obviously be used also for passengers who sit on other seats, such as the driver of the vehicle.

Figure 9:
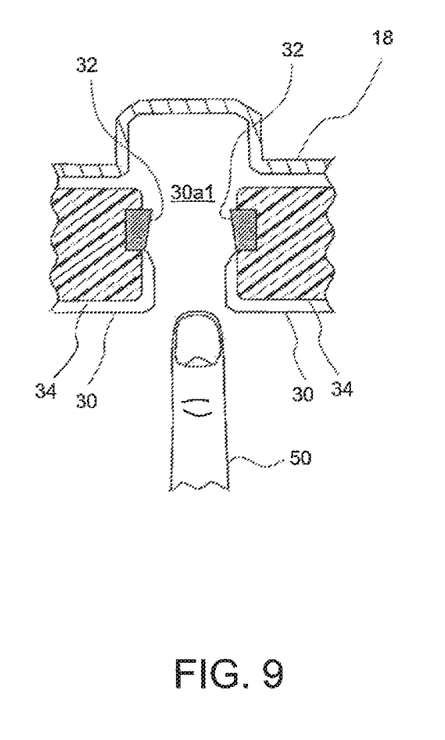
FIG. 9 is a cross sectional view taken along line D-D in FIG. 7 with a finger to be inserted into a hole.

A process to remove the speaker grille 40 is described below with reference to FIG. 9. FIG. 9 is a cross sectional view around the expanded space 30a1 taken along line D-D shown in FIG. 7. FIG. 9 supplementary shows an operator's finger 50 of merely for reference.

As shown in FIG. 9, in the opening 30a, the expanded space 30a1 that is not covered with the speaker grille 40 has a size to allow insertion of operator's one or more standard-size fingers 50. In this way, the operator can insert the finger 50 into the expanded space 30a1 to press the detach button of the push rivet 40d on the back surface to make the push rivet 40d removable. In this state, the speaker grille 40 can be removed from the opening 30a by hooking the speaker grille 40 with a finger inserted in the expanded space 30a1 and applying a force towards the outer side of the seat. Then, the seatback 10b can be removed from the vehicle body by removing the bolts 27a, 27b.

As shown in FIG. 9, the seat bracket 18 to which a bending process has been applied surrounds the back side of the expanded space 30a1. In this way, the operator can extend one or more of his or her fingers 50 to the push rivet 40d, but not further. Thus, the operator can be prevented from cutting the finger 50 by touching an edge of the seat bracket 18 or edges of any portions of the speaker 24. Further, because the finger 50 cannot reach wiring of the speaker 24, no damage can be caused to the speaker 24. In addition to operators, passengers (including children) who sit on the seat may insert their fingers into the expanded space 30a1. However, because the seat bracket 18 protects the inner side of the expanded space 30a1 in consideration of sizes of children's fingers, injuries to passengers can be prevented.

In the above description, the seatbacks are assumed, as examples, to be used as vehicle rear seats in which the seatback is secured to the vehicle body. However, the seatbacks according to embodiments of the present disclosure may be applied also to angle-adjustable seatbacks, such as driver's seats. Specifically, the above-described embodiments may be applied by not securing the speaker or the structural members of the seatback to the vehicle body. In such a case, the speaker is not necessarily disposed on the front surface of the seatback (surface with which a passenger's back is in contact). The speaker may be disposed, for example, on the back or side surface of the seatback.

In the above descriptions, the opening expands in areas in front of not only the speaker but also joint portions of the seatback structural members, the speaker, and the vehicle body such that the speaker grille entirely covers the joint portions. However, the opening may be disposed in front of the speaker alone so that the speaker grille covers in front of the speaker alone. In particular, when the seatback is not used for a vehicle rear seat and the seatback is not secured to the vehicle body, the opening may be disposed in front of the speaker alone.

In the above descriptions, the structural members (the pipe members, the seat brackets, the speaker bracket) of the seatback are assumed to be made of metal. However, as long as a required strength and durability can be ensured, the structural members may be partially or entirely made of other materials, such as a resin. Further, in the above description, flexible urethane and synthetic leather are raised as examples of the pad members, but other materials, such as a foam resin, may be used in place of urethane. Other variations are also possible including an embodiment in which natural leather is used in place of the synthetic leather, or urethane or the like is attached on the backside of the synthetic leather. Yet other variations are possible, including an embodiment in which in place of the rigid urethane segment, another synthetic resin member is used, or multiple members made of some types of synthetic resins are bonded together.

Although specific embodiments are described in the above descriptions to facilitate understanding, these embodiments are provided merely as examples. Various other embodiments are available.

The invention claimed is:

1. A seatback comprising:
   one or more structural members disposed inside the seatback of a vehicle seat;
   a speaker secured to the one or more structural members, the speaker comprising a diaphragm;
   a speaker grille disposed in front of the diaphragm to protect the diaphragm; and
   a pad member covering a front surface of the seatback,
   an opening through the pad member and in front of the diaphragm of the speaker,
   an elastic member that is more rigid than the pad member is disposed to surround the opening, the elastic member being further inside the opening than the pad member, and
   the speaker grille is inserted and secured in the elastic member to cover the opening, wherein
   an inner circumferential surface of the elastic member surrounding the opening is angled such that the opening within the elastic member continuously tapers to be smallest adjacent the speaker and largest adjacent the front surface of the seatback.

2. The seatback according to claim 1, wherein
   each of the opening and the elastic member is formed to have an expanded perimeter portion that circumferentially outwardly protrudes from the perimeter of the speaker grille, and
   when the speaker grille is inserted and secured in the elastic member, a space is formed by the expanded perimeter portion between the speaker grille and the opening and between the speaker grille and the elastic member.

3. The seatback according to claim 1, wherein
   each of the speaker grille and the one or more structural members comprises a joint portion such that the joint portions are secured together when the speaker grille is inserted and secured in the elastic member.

* * * * *